E. R. KNOTT.
CANDY CUTTING MACHINE.
APPLICATION FILED MAR. 26, 1909.
949,434.
Patented Feb. 15, 1910.
3 SHEETS—SHEET 2.
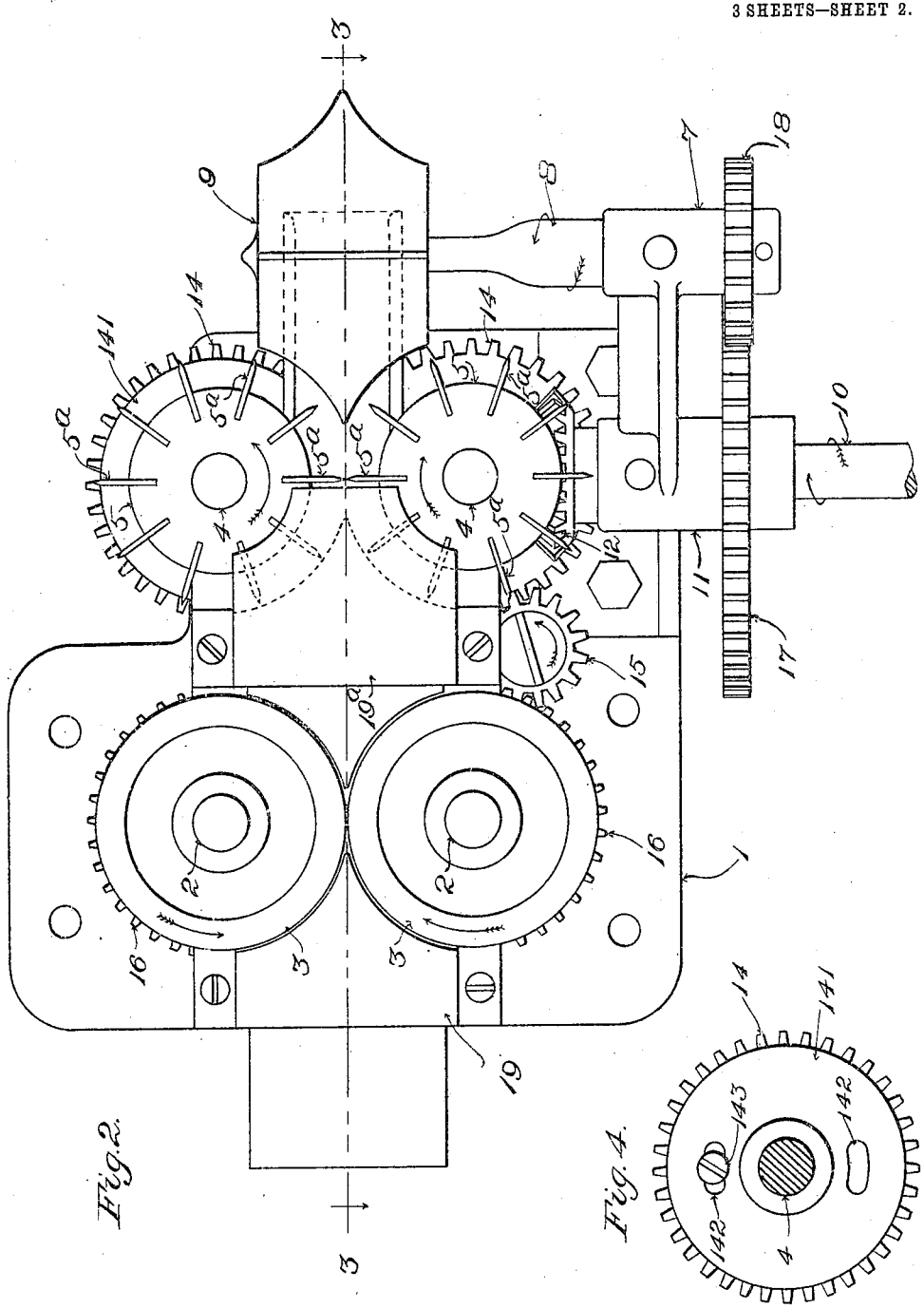
Witnesses:
Oscar F. Hill
Edith J. Anderson
Inventor:
Eustace R. Knott
by Chas. F. Randall
Attorney.

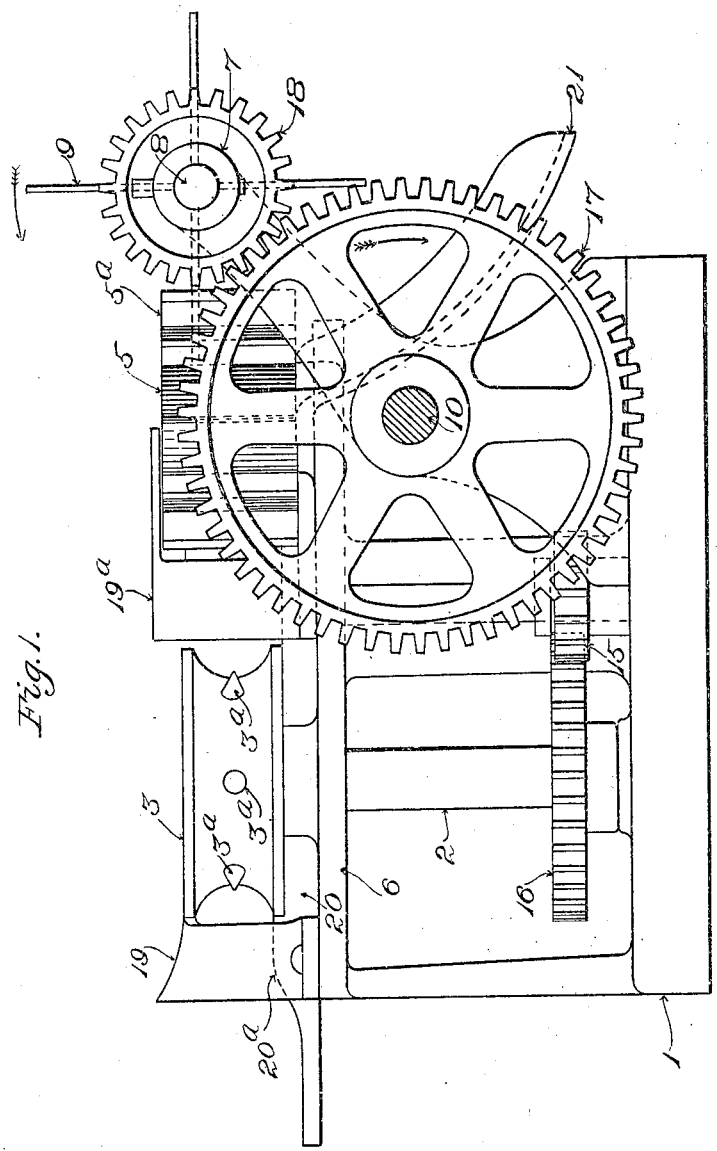

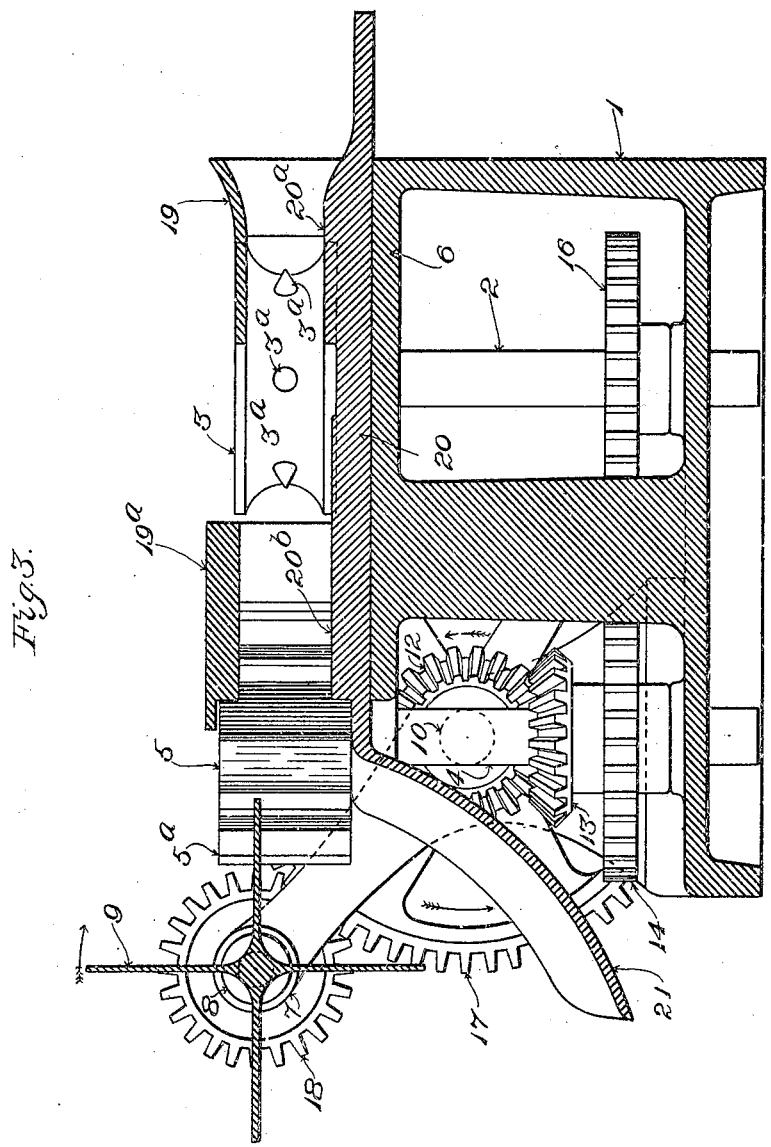

UNITED STATES PATENT OFFICE.

EUSTACE R. KNOTT, OF SHARON, MASSACHUSETTS.

CANDY-CUTTING MACHINE.

949,434.

Specification of Letters Patent.   Patented Feb. 15, 1910.

Application filed March 26, 1909. Serial No. 485,960.

*To all whom it may concern:*

Be it known that I, EUSTACE R. KNOTT, a citizen of the United States, residing at Sharon, in the county of Norfolk, State of Massachusetts, have invented a certain new and useful Improvement in Candy-Cutting Machines, of which the following is a specification, reference being had therein to the accompanying drawings.

The invention consists in a machine of improved construction for cutting into short lengths or pieces of uniform size, as for kisses, a batch of candy which has been drawn out into a long roll or strip.

According to the invention, I employ cutting rolls that rotate around axes which extend upward and downward, and the moving fly which detaches the said short lengths or pieces from the blades of the rolls, and from one another, as they issue from between the rolls, is arranged to strike them downward so that they will fall close together in one place directly in front of the machine. An apron or chute is arranged below the fly to receive the lengths or pieces as they fall. I also employ sizing-rolls located in immediate juxtaposition to the said cutting rolls.

An embodiment of the invention is shown in the drawings, in which—

Figure 1 is an elevation of a machine containing the said embodiment. Fig. 2 is a plan thereof. Fig. 3 is a view in vertical section in the plane of the dotted line 3, 3, Fig. 2, looking in the direction indicated by the arrows at the ends of such line. Fig. 4 is a detail plan view showing more particularly adjusting means by which the blades of one cutting roll are caused to register correctly with those of the other.

Having reference to the drawings,—the frame 1 is provided with bearings in which are mounted the two shafts 2, 2, upon which the pair of sizing rolls 3, 3, are fixed. The said shafts are in this instance parallel with each other, and vertical, which I prefer, although I do not in all cases restrict myself in these respects. The said frame is provided also with bearings in which are mounted the second pair of shafts 4, 4, upon which the pair of cutting rolls 5, 5, are fixed. The said shafts 4, 4, also are parallel with each other, and vertical, although I do not limit myself to a strictly parallel or vertical arrangement. The rolls 3, 3, and 5, 5, are mounted upon the upper ends of their respective shafts, above the upper horizontal portion, or table, 6, of the machine frame, the bearings of the shafts being entirely below the rolls. This affords more convenient access to the rolls and to the candy passing between them. The frame 1 also is provided with a bearing at 7, at the front of the machine, in which is mounted the shaft 8, of the fly 9. The shaft 8 is horizontal, and hence the blades of the fly rotate in a vertical plane.

The actuating mechanism for the rolls comprises the horizontal driving-shaft 10, which is mounted in a bearing at 11 upon the machine-frame, a bevel-gear 12 fixed on the inner end of the driving-shaft, a bevel-gear 13 fixed on one of the shafts 4 and in mesh with bevel-gear 12, whereby such shaft 4 and its cutter-roll 5 are rotated from the driving-shaft, spur-gears 14, 14, on the respective shafts 4, 4, meshing with each other and operating to cause such shafts and their respective cutter-rolls 5, 5, to rotate in unison, a carrier spur-pinion 15 meshing with one of the spur-gears 14 and also with a spur-gear 16 on the shaft 2 of one of the sizing rolls 3, 3, and transmitting rotary motion to the latter shaft and roll, and a spur-gear 16 on the shaft 2 of the other sizing roll 3, meshing with the first spur-gear 16, and causing the two sizing rolls 3, 3, to rotate in unison. The fly 9 is actuated by means of a spur-gear 17 fixed on the driving-shaft 10 and meshing with a spur-pinion 18 fixed on fly-shaft 8, the gearing being so proportioned that a wing or arm of the fly-wheel shall pass down within each opening in succession between the registering blades of the cutter-rolls as the latter rotate.

The sizing rolls 3, 3, are made with concave peripheries to receive the roll or strip of candy, shape or form the same somewhat, and reduce it to uniform diameter. See, more particularly, Fig. 3. The said peripheries are furnished with pointed spurs 3ª, 3ª, etc. These engage with the roll or strip and operate to positively advance it. They also punch holes in the roll or strip of candy permitting any confined air to escape, which obviates tendency of such air to be crowded back by the action of the sizing rolls into bubbles at the entering side of the rolls. The formation of such bubbles is undesirable since they cause variations in the amount of candy in a given length. At the entering side of the rolls 3, 3, an arched guide 19 is located, having a flaring entrance, as shown best in Fig. 3. A somewhat similar confining guide or arch 19ª is located between the rolls 3, 3, and the cutter rolls 5, 5. The cutting-blades of the cutter-rolls are designated 5ª, 5ª, etc.

A guide-plate 20 extends from the entering end of the machine through into proximity to the cutter-rolls, and an extension 21 thereof constitutes an apron or chute extending forward and downward in front of the cutter and below the fly. The said guide-plate has an elevated portion 20ª, in front of the entrance between the rolls 3, 3, serving to uphold the candy above the lower rims of such rolls, the said elevated portion, and the top portion of arch 19, serving to insure that the candy shall be received entirely within the concavities of the rolls. The portion 20ᵇ of the said guide-plate that is adjacent the entrance between the cutter-rolls is elevated sufficiently with respect to the lower ends of the cutter-blades 5ª, 5ª, etc., to lift the candy above such ends, while the guide 19ª prevents the candy from rising above the upper ends of the blades. Apron or chute 21 has raised side-edges, as shown, which prevent the pieces of candy from scattering laterally. Its upper end extends back in under the lower ends of the cutter-rolls to practically the point at which the blades of the two rolls come together or meet, so as to leave the pieces of candy free to drop as soon as they are struck down by the blades of the fly. The working ends of the said blades are shaped to conform to the circular paths of the edges of the cutter-blades (see Fig. 2) and the tip ends thereof enter between the said paths to a point close to the said meeting point, so as to strike down the pieces of candy promptly and prevent them from sticking to the cutter-blades and being carried around to either side thereby. The apron or chute partially covers the spur-gears 14, 14, and prevents the pieces of candy from falling upon the same.

As will be apparent, the detached pieces of candy all fall close together in front of the delivery end of the apron or chute.

By preference, the sizing-rolls are located as close to the cutter-rolls as possible, leaving room between for the guide 19ª only. This obviates the tendency to differences in the sizes of the lengths or pieces which are produced by the action of the cutter-rolls. The action of the blades as they approach one another in curved paths at opposite sides of the roll or strip of candy is to crowd forward the portion about to be severed. This tends to increase the size of such portion. This increment, multiplied by the number of lengths or pieces contained in a considerable length of candy intervening between cutter-rolls and sizing rolls as in machines heretofore constructed, contributes to inequalities in the sizes of the severed pieces.

For the purpose of enabling the cutter-blades of one roll 5 to be made to register accurately with those of the other roll 5, the gear 14 in connection with the shaft of one of the said rolls is connected with such shaft in manner permitting relative angular or rotary shift or adjustment of the said shaft and gear with respect to each other. Thus, as shown in Fig. 4, such gear is secured to a disk 141 on the said shaft, by means of screws 143, 143, passing through slots 142, 142, in the disk and entering threaded holes which are tapped in the gear. These slots extend concentrically with respect to the shaft, permitting the required angular shift to be made when the screws have been loosened. One of such screws is omitted from Fig. 4, in order to show more clearly the corresponding slot 142.

I claim as my invention:—

1. In a candy-cutting machine, in combination, cutter-rolls rotating on axes which extend upward and downward, and a fly working downward in the opening between the blades of such rolls.

2. In a candy-cutting machine, cutter-rolls rotating on axes which extend upward and downward, a fly working downward in the opening between the blades of such rolls, and an apron or chute below the fly and cutter-rolls and receiving the pieces of candy therefrom.

3. In a candy-cutting machine, in combination, a pair of cutter-rolls, and a pair of feeding and sizing rolls located in immediate proximity to the entrance between the cutter-rolls and delivering directly into the same.

In testimony whereof I affix my signature in presence of two witnesses.

EUSTACE R. KNOTT.

Witnesses:
CHAS. F. RANDALL,
EDITH J. ANDERSON.